UNITED STATES PATENT OFFICE.

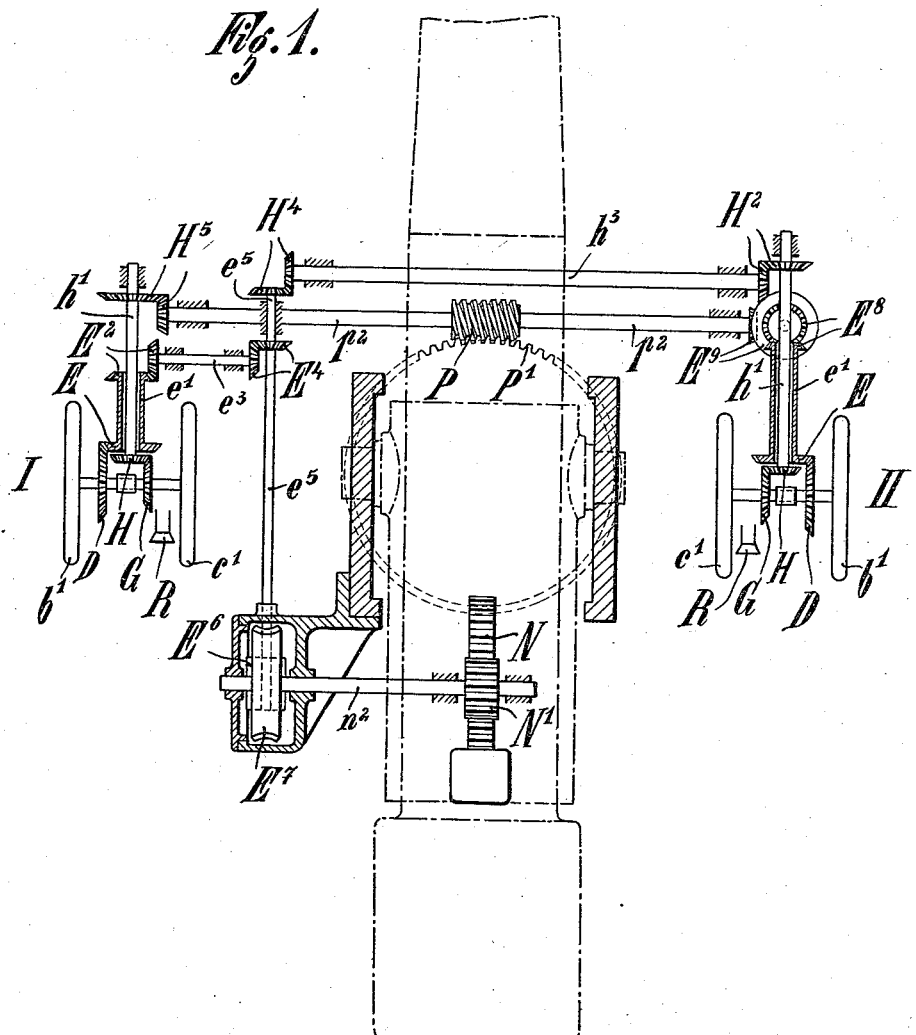

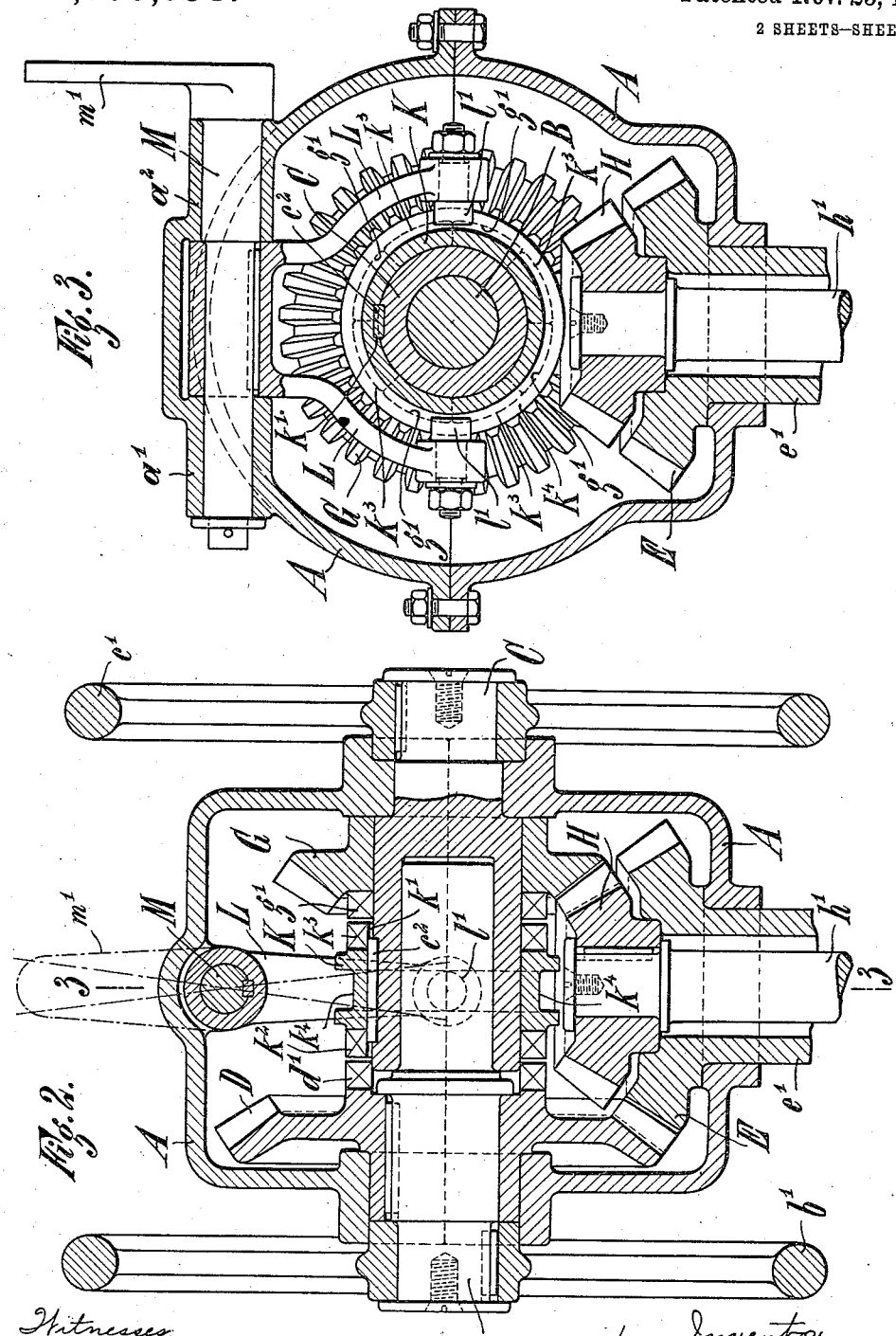

HANS STRAUSS, OF ESSEN-ON-THE-RUHR, GERMANY, ASSIGNOR TO FRIED. KRUPP AKTIENGESELLSCHAFT, OF ESSEN-ON-THE-RUHR, GERMANY.

DRIVING DEVICE FOR GUN ELEVATING AND TRAINING GEARS.

1,079,893. Specification of Letters Patent. Patented Nov. 25, 1913.

Application filed March 18, 1913. Serial No. 755,146.

*To all whom it may concern:*

Be it known that I, HANS STRAUSS, residing at Essen-on-the-Ruhr, Germany, a subject of the Emperor of Germany, have invented a certain new and useful Improvement in Driving Devices for Gun Elevating and Training Gears, of which the following is a specification.

This invention relates to a driving device for elevating and training gears for guns, and more particularly to such devices as are provided with two driving mechanisms of which each has two hand wheels and two driving shafts simultaneously operated by one man.

The subject matter of the present invention resides in an improvement in driving devices of this kind, wherein not only each driving mechanism may operate the two gun directing gears, but also the elevating gear may be operated by both hand wheels of the one mechanism, and the training gear operated by both hand wheels of the other mechanism.

One embodiment of the invention is illustrated in the accompanying drawings wherein—

Figure 1 is a diagrammatic representation of the driving device and the parts of the mount related thereto; Fig. 2 shows one of the driving mechanisms in an axial section through the hand wheels, and Fig. 3 a section on line 3—3 of Fig. 2 seen from the left.

The arrangement illustrated in Figs. 2 and 3 will first be described.

In a two piece housing A are mounted two shafts B and C in coaxial bearings, which shafts each have a hand wheel $b^1$ and $c^1$ respectively. On the shaft B is secured a bevel wheel D which is in mesh with a bevel wheel E carried by a hollow shaft $e^1$ mounted in the housing A. The shaft C carries a bevel wheel G which is in mesh with another bevel wheel H, the former of which is revoluble, but axially non-displaceable on shaft C and the latter bevel wheel H is rigidly secured on a shaft $h^1$, which is coaxial with the hollow shaft $e^1$. A coupling muff K is arranged on the shaft C between the bevel wheels D and G, which coupling muff is axially displaceable but non-revolubly connected with the shaft C by means of key $c^2$ and groove $k^1$. The muff K carries on each side claws $k^2$ and $k^3$ respectively, which are intended to coöperate with correspondingly shaped claws $d^1$ $g^1$ on the bevel wheels D, G, respectively, in the manner of a claw coupling. The muff K is furthermore provided with an annular groove $k^4$ engaging with two trunnions $l^1$ of a fork-shaped lever L. This lever L is non-revolubly mounted on a shaft M which is carried in bearings $a^1$ and $a^2$ in the housing A and is provided with a handle $m^1$. This handle may be held by means of a dog (not shown) in two positions wherein the muff K is in engagement with one of the bevel wheels D and G. In the drawing the muff K is represented in its idle position.

In Fig. 1 are shown two of the described driving mechanisms designated with I and II which serve as driving devices for the two directing gears of the gun. The shafts $e^1$ and $h^1$ of the two mechanisms are therein connected in the following manner with the directing gears. The shaft $e^1$ of the driving mechanism I and the shaft $h^1$ of the driving mechanism II have gearing connection with the elevating gear of the gun. The elevating gear comprises a toothed arc N secured to the cradle of the gun mount, and this toothed arc is in mesh with a gear wheel $N^1$ which is mounted in bearings in the body of the carriage. The connection of the shaft $e^1$ of the driving mechanism I with the gear wheel $N^1$ is accomplished by means of a pair of bevel wheels $E^2$, a shaft $e^3$, a second pair of bevel wheels $E^4$, a shaft $e^5$, a worm $E^6$ and a worm wheel $E^7$, which latter is mounted on the shaft $n^2$ of the gear wheel $N^1$. The shaft $h^1$ of the driving mechanism II has gearing connection with the shaft $e^5$ and consequently also with the elevating gear by means of a pair of bevel wheels $H^2$, a shaft $h^3$ and a second pair of bevel wheels $H^4$. The shaft $h^1$ of the driving mechanism I and the shaft $e^1$ of the driving mechanism II are moreover in gearing connection with the training gear. The training gear comprises a worm P, which is in mesh with a toothed circle $P^1$ on the carriage body. The connection of the shaft $h^1$ of the driving mechanism I with the shaft $p^2$ of the worm P is accomplished by means of a pair of gear wheels $H^5$, while between the shaft $p^2$ and the shaft $e^1$ of the driving mechanism II are inserted two pairs of bevel wheels $E^8$ and $E^9$.

If the two driving mechanisms, together with the necessary sighting device R, Fig. 1, can be used, and if besides a sufficient number of cannoneers are available the muff K will be so adjusted in both of the driving mechanisms I and II that its claws $k^2$ engage with the claws $d^1$ of the bevel wheels D. In each driving device the two hand wheels $b^1$ and $c^1$ are then in gearing connection with the bevel wheels D and E and the shaft $e^1$, whereby the elevating gear may be operated by the two hand wheels of the driving device I and the training gear of the gun operated by the two hand wheels of the driving device II. The driving of the two gears may consequently be accomplished by the exertion of the greatest power, that means, with the greatest possible speed. The parts $h^1$, H and G of the driving device II will then run idle in driving the elevating gear and the same parts of the driving mechanism I will run idle in driving the training gear.

Should one of the two driving devices be inoperative for instance in consequence of covering the sight field of the corresponding sighting device R through the shield of the mount; or in consequence of the disabling of the serving cannoneer, the two directing gears may then be operated from the single useful driving mechanism. The muff K of said mechanism will then have to be so adjusted that its claws $k^3$ are in engagement with the claws $q^1$ of the bevel wheel G. The hand wheel $b^1$ is then connected with one of the directing gears by means of the bevel wheels D and E and shaft $e^1$, and the hand wheel $c^1$ in gearing connection with the other directing gear by means of parts C, K, G, H and $h^1$.

I claim:—

1. In a gun directing mechanism, having both elevating and training gears, two sets of driving mechanisms, each operable by one man and each comprising a pair of hand wheels; the first of said hand wheels in the first set of said driving mechanisms having permanent gearing connection with the elevating gear; and the first of said hand wheels in the second set of said driving mechanisms having permanent connection with the training gear; and coupling means in each of said sets of driving mechanisms, said coupling means constructed to connect the second of said hand wheels in either of said sets of driving mechanisms with the first of said hand wheels in the same, or the first of said hand wheels in the other of said sets of driving mechanisms; whereby the elevating gear may be operated by both wheels in the one set, and the training gear by both wheels in the other set; or the elevating gear by one hand wheel and the training gear by the other hand wheel in the same set of driving mechanisms.

2. In a gun directing mechanism, having both elevating and training gears, two sets of driving mechanisms, each operable by one man and each comprising a pair of hand wheels; the first of said hand wheels in the first set of said driving mechanisms having permanent gearing connection with the elevating gear; and the first of said hand wheels in the second set of said driving mechanisms having permanent gearing connection with the training gear; a coupling means in each of said sets of driving mechanisms; said coupling means comprising a shaft for the second hand wheel, a gear wheel running loose on said shaft, a muff keyed to slide on said shaft, claws on both ends of said muff and corresponding claws on said gear wheel and on an adjacent part of the permanent gearing connection respectively, a shifting lever adapted to hold said muff in either of its three positions, viz. first idle position, second in engagement with said gear wheel or third in engagement with said permanent gearing connection; said gear wheel in one of said sets of driving mechanism being constantly in engagement with the permanent gearing connection in the other of said sets of driving mechanisms; whereby the elevating gear may be operated by both wheels in the one set; and the training gear by both wheels in the other set; or the elevating gear by one hand wheel and the training gear by the other hand wheel in the same set of driving mechanisms.

The foregoing specification signed at Barmen, Germany, this 25th day of February, 1913.

HANS STRAUSS. [L. S.]

In presence of—
  HELEN NUFER,
  ALBERT NUFER.

---

Copies of this patent may be obtained for five cents each, by addressing the "Commissioner of Patents, Washington, D. C."